(12) United States Patent
Molina et al.

(10) Patent No.: US 10,164,800 B2
(45) Date of Patent: Dec. 25, 2018

(54) CHANNEL ESTIMATION USING PEAK CANCELLATION

(71) Applicant: Intel Corporation, Santa Clara, CA (US)

(72) Inventors: Albert Molina, Novelda (ES); Kameran Azadet, San Ramon, CA (US)

(73) Assignee: Intel Corporation, Santa Clara, CA (US)

( * ) Notice: Subject to any disclaimer, the term of this patent is extended or adjusted under 35 U.S.C. 154(b) by 98 days.

(21) Appl. No.: 15/475,783

(22) Filed: Mar. 31, 2017

(65) Prior Publication Data
US 2018/0287827 A1 Oct. 4, 2018

(51) Int. Cl.
*H04L 25/02* (2006.01)
*H04L 27/26* (2006.01)
*H04B 7/0413* (2017.01)
*H04J 13/00* (2011.01)

(52) U.S. Cl.
CPC ...... *H04L 25/0228* (2013.01); *H04L 27/2663* (2013.01); *H04B 7/0413* (2013.01); *H04J 13/0062* (2013.01); *H04L 27/262* (2013.01); *H04L 27/263* (2013.01)

(58) Field of Classification Search
CPC ........ G01S 5/0215; G01S 3/74; G01S 5/0205; G01S 13/878; G01S 5/0273; G01S 5/14
See application file for complete search history.

(56) References Cited

U.S. PATENT DOCUMENTS

| | | | |
|---|---|---|---|
| 2006/0223441 A1* | 10/2006 | Darwood | H04L 7/042 455/67.11 |
| 2007/0183371 A1 | 8/2007 | McCoy | |
| 2011/0002412 A1 | 1/2011 | Hou et al. | |
| 2014/0177427 A1 | 6/2014 | Yiu et al. | |
| 2015/0156037 A1 | 6/2015 | Sahlin et al. | |
| 2016/0044630 A1* | 2/2016 | Markhovsky | H04W 64/006 455/456.6 |
| 2016/0365991 A1* | 12/2016 | Ganesan | H04L 25/0204 |
| 2017/0026798 A1* | 1/2017 | Prevatt | H04W 4/023 |

FOREIGN PATENT DOCUMENTS

WO 2017/026975 A1 2/2017

OTHER PUBLICATIONS

Search Report dated Apr. 4, 2018 for International Application No. PCT/US2018/014670.

* cited by examiner

*Primary Examiner* — Jung H Park
(74) *Attorney, Agent, or Firm* — Schiff Hardin LLP

(57) ABSTRACT

An apparatus and a method for estimation a wireless channel are disclosed. For example, the method correlates, by a correlator, a plurality of signals of a combined signal received by a receive antenna over the wireless channel from a plurality of transmit antennas, with respective DMRSs of the plurality of transmit antennas, converts, by a converter, the correlated plurality of signals from frequency to time domain, iteratively peak cancels, by a peak canceller, a largest peak of the combined impulse response and stores a scaling factor and location pair of the cancelled peak until a magnitude of a next largest peak is below a predetermined threshold, assigns, by an assigner, each of the scaling factor and location pairs to a transmit antenna, and estimates, by an estimator, for each of the plurality of transmit antennas, the wireless channel based on the assigned scaling factor and location pairs.

25 Claims, 4 Drawing Sheets

CHANNEL ESTIMATION USING PEAK CANCELLATION

The present disclosure describes a method and an apparatus for performing channel estimation using peak cancellation. Although, the method is described for a channel of a Long Term Evolution (LTE) network, the channel estimation using peak cancellation may be performed for channels of any type of wireless network, e.g., a 3G network, a 5G network, and the like.

BACKGROUND

A wireless communication service may be provided via different types of networks, e.g., LTE networks, and the like. Any number of User Equipment (UE) may communicate via each base station, e.g., an eNodeB. As the number of UEs continues to grow, the number of antennas and the number of UEs communicating via a same antenna also continues to grow. For example, a Multiple-Input-Multiple-Output (MIMO) system with four transmit and four receive antennas may be used on the LTE network.

However, as the wireless networks continue to evolve, e.g., to 5G and beyond, the number of antennas of future antenna systems may grow to larger sizes. For example, the MIMO system may be a 128×128 system. As such, signals from a large number of UEs may be multiplexed onto a channel. In addition, the UEs may be accessing services with varying service requirements. When the number of UEs being multiplexed is large, errors in channel estimation may adversely impact the performance of the channel in supporting the various services.

BRIEF DESCRIPTION OF THE DRAWINGS

The teaching of the present disclosure can be more fully understood by reading the subsequent detailed description and examples in conjunction with references made to the accompanying drawings, in which.

To facilitate reading, identical reference numbers are used to designate elements that are common to various figures, where possible.

DETAILED DESCRIPTION

The present disclosure relates to an apparatus and a method for performing channel estimation. For example, the teaching of the present disclosure may be for performing channel estimation by peak cancellation for communication over a wireless network, e.g., a Long Term Evolution (LTE) network, a 5G network, etc.

Figure 1:
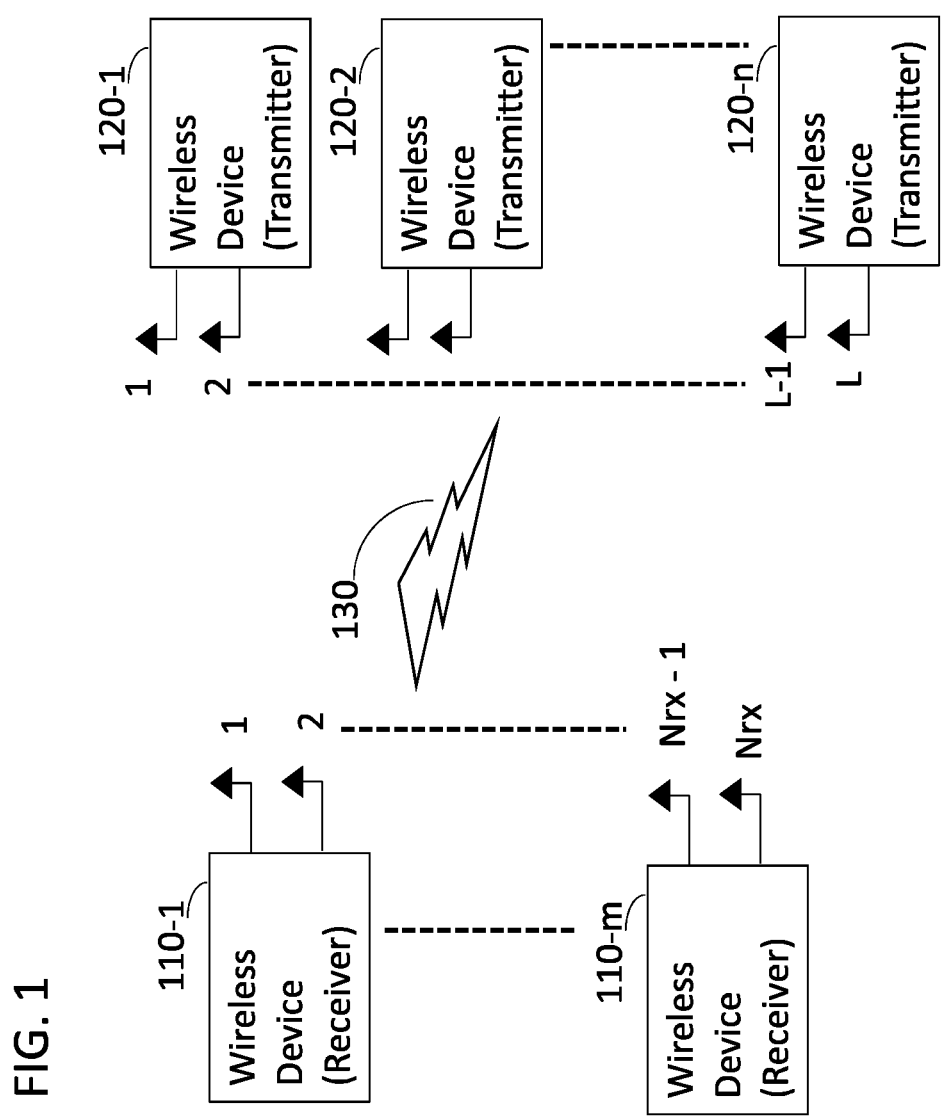
FIG. 1 illustrates a wireless network for providing services to wireless devices.

FIG. 1 illustrates a wireless network 100 for providing services to wireless devices. The wireless network 100 comprises receiver wireless devices 110-1, 110-2, . . . , 110-m and transmitter wireless devices 120-1, 120-2, . . . , 120-n communicating over a wireless channel 130. For example, the receiver wireless device may be a base station and the transmitter wireless devices may be user equipment. In another example, the receiver wireless device may be a user equipment and the transmitter wireless device may be a base station.

Each of the receiver wireless devices may comprise any number of receive antennas. Similarly, each of the transmitter wireless devices may comprise any number of transmit antennas. For example, suppose the wireless channel 130 is a channel of a MIMO communications system and channel 130 is for supporting L transmit antennas and $N_{rx}$ receive antennas. Then, $N_{rx}$ represents a maximum number of a receive antennas of the receiver wireless devices 110-1, 110-2, . . . , 110-m. Similarly, L represents a maximum number of transmit antennas of the transmitter wireless devices 120-1, 120-2, . . . , 120-n. In such a case, channel 130 may be referred to as a Multi User-MIMO (MU-MIMO) channel.

It is noted that, for the purpose of channel estimation, the MU-MIMO is equivalent to a channel having L transmit antennas belonging to up to L transmitter wireless devices. For example, suppose the transmitter wireless devices are UEs and the receiver wireless devices are base stations. Then, each UE may have one transmit antenna or multiple transmit antennas.

Those ordinarily skilled in the present art realize that the antennas of the present disclosure may be antennas of a transceiver that may be used for both transmission and reception of a wireless signal. For clarity as to a direction of transmission, the present disclosure is described using "receive antenna" and "transmit antenna." In other words, without loss of generality or adding any limits as to implementations, the receiver and transmitter portions of a transceiver antenna may be described, separately.

In an LTE network, a radio resource is provided in accordance with the LTE standard. The radio resource of the LTE network is a two-dimensional quantity with one dimension being for time domain and another dimension being for frequency domain. The LTE network of the present disclosure may use an Orthogonal Frequency Division Multiplex (OFDM) scheme in accordance with an OFDM standard.

In OFDM, a large number of closely spaced orthogonal sub-carrier signals may be used for encoding data. The dimension for frequency is used for a number of sub-carriers, with each sub-carrier carrying a modulation symbol. In accordance with the OFDM standard, each OFDM symbol transmitted by a given UE comprises $N_{sc}$ occupied sub-carriers. The $N_{sc}$ occupied sub-carriers are located at frequencies kΔf, where $$k = -\frac{N_{sc}}{2}, \ldots, \frac{N_{sc}}{2} - 1.$$

The dimension for time is measured in units of OFDM symbols.

A UE transmits a plurality of sub-frames of OFDM symbols. Each sub-frame of the plurality of sub-frames of the OFDM symbol transmitted by the given UE consists of a Demodulation Reference Symbol (DMRS) followed by data symbols. The DMRS is a symbol used for coherent demodulation at the receive antenna.

Prior to transmission, the UE may convert each OFDM symbol to the time domain. Then, a cyclic prefix is attached to the resulting OFDM symbol in the time domain. The UE then transmits the resulting signal to any number of receive antennas over the wireless MU-MIMO channel. For an illustrative example, the UE may convert the OFDM symbol to the time domain using an N-point Inverse Discrete Fourier Transform (IDFT), an Inverse Fast Fourier Transform (IFFT), or an Inverse Fourier Transform (IFT). Then, the cyclic prefix, e.g., a prefix of size P, is attached to the resulting OFDM symbol prior to transmission towards the receive antennas.

It is noted that the N-point IDFT for a band limited scenario is described below in conjunction with equations 5-7 of Example 1.

Returning to FIG. 1, suppose the transmitter wireless devices 120-1, 120-2, . . . , 120-$n$ are UEs and each UE has one transmit antenna. The receiver receives signals from a plurality of UEs. The OFDM symbol transmitted by a given UE consists the DMRS of the transmit antenna of the UE followed by the data symbols.

As illustrated in FIG. 1, $N_{rx}$ receive antennas of the receiver wireless devices 110-1, 110-2, . . . , 110-$m$ are located at the other end of channel 130. A given receiver wireless device may comprise an array of antennas for receiving wireless signals and an apparatus for estimating a channel. The estimating of the channel may be performed for each antenna of the array of antennas of the given receiver wireless device.

Figure 2:
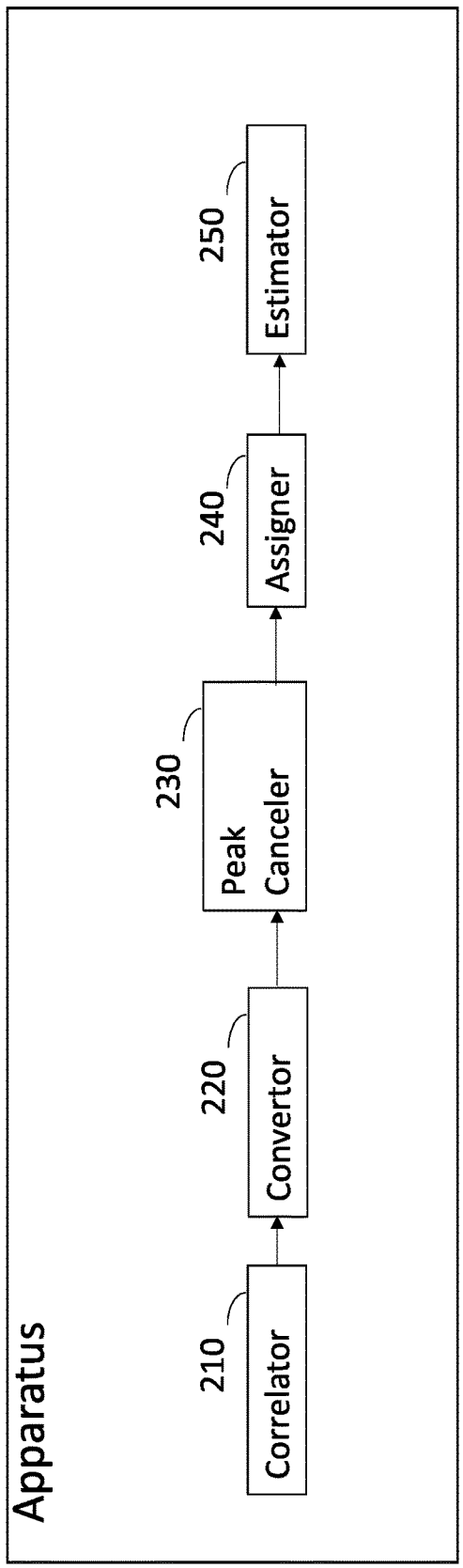
FIG. 2 illustrates an apparatus for performing channel estimation for a received signal in accordance with the teachings of the present disclosure.

FIG. 2 illustrates an apparatus 200 for performing channel estimation for a received signal in accordance with the teachings of the present disclosure. This apparatus 200 is comprised within each of the wireless devices 110-1, 110-2, . . . , 110-$m$ described above with respect to FIG. 1. The apparatus 200 comprises a correlator 210, a convertor 220, a peak canceller 230, an assigner 240 and an estimator 250.

The correlator 210 is configured to correlate a plurality of signals of a combined signal received by a receive antenna over the wireless channel from a plurality of transmit antennas, with respective demodulation reference symbols (DMRSs) of the respective plurality of transmit antennas.

In one aspect, the DMRSs of the respective plurality of transmit antennas are known. For example, the receiver wireless device may know the DMRSs of the transmit antennas from which wireless signals are received. For instance, a base station receiving wireless signals from transmit antennas of UEs may know the DMRSs of the transmit antennas of the UEs.

In one aspect, the correlating by the correlator 210 is performed by selecting occupied one or more sub-carriers of each of the plurality of signals in a frequency domain, match filtering the selected sub-carriers, and zero-extending the match filtered sub-carriers in accordance with symbol converters of the respective transmit antennas.

In one aspect, the match filtering is performed using filters derived to match the DMRSs of the respective transmit antennas. In one aspect, the DMRSs of the respective plurality of transmit antennas comprise a Zadoff-Chu base sequence that is zero-extended and multiplied by a linear phase complex exponential in the frequency domain. Then, the filters are derived, for each transmit antenna, to match the respective Zadoff-Chu base sequences that are zero-extended.

In one aspect, the symbol converters of the respective plurality of transmit antennas are known to the receiver. For example, the symbol convertor may be OFDM symbol converters.

In one aspect, the input to the correlator 210 comprises the plurality of signals of the combined signal derived by removing cyclic prefixes in the time domain, and converting the combined signal to the frequency domain. For example, when a wireless signal reaches a receiver wireless device, the cyclic prefix may be removed from the received signal in the time domain. Then, an N-point Discrete Fourier Transform (DFT) may be performed to convert the signal back to the frequency domain. The output of the DFT may then be the input to the correlator 210. The correlator may then proceed with selecting of the occupied sub-carriers in the frequency domain, as described above.

The converter 220 is configured to convert the correlated plurality of signals from frequency domain to time domain. The converted plurality of signals comprise a combined impulse response of the combined signal received by the receive antenna.

In one aspect, the converting by the converter 220 comprises: scaled inverse discrete Fourier transforming of the correlated signal of the plurality of correlated signals, determining Inverse Fourier Transforms (IFT) of the correlated plurality of signals, or determining inverse Fast Fourier Transforms (IFFT) of the correlated plurality of signals. In one aspect, the scaled inverse discrete Fourier transforming comprises converting the correlated signal to time domain and multiplying a result of the converting by a scaler quantity.

The peak canceler 230 is configured to iteratively peak cancel a largest peak of the combined impulse response and store a scaling factor and location pair of the cancelled peak until a magnitude of a next largest peak is below a predetermined threshold.

In one aspect, the canceling of the largest peak comprises, determining the location of the largest peak of the combined impulse response and subtracting, from the combined impulse response, a band limited pulse defined at the location of the largest peak. The band limited pulse that is subtracted from the combined impulse response is scaled according to the scaling factor of the largest peak. In one aspect, the band limited pulse comprises a digital Sinc function.

In one aspect, the determining of the location of the largest peak is performed by band limiting each impulse response of the combined impulse response, and computing squares of magnitudes of each of the impulse responses of the combined impulse response, and identifying the location of the largest peak as the location of the impulse response associated with a maximum of the computed squares of magnitudes.

The assigner 240 is configured to assign each of the scaling factor and location pairs that are stored by the peak canceler to a transmit antenna of the plurality of transmit antennas. For example, if there are L transmit antennas, one of the pairs of scaling factor and location is assigned to each of the L transmit antennas.

The estimator 250 is configured to estimate, for each of the plurality of transmit antennas, the wireless channel based on the assigned scaling factor and location pairs. In one aspect, the estimator is configured to perform the estimating, for each of the plurality of transmit antennas, by determining a frequency response of the wireless channel as a weighted sum of linear phase rotations in the frequency domain based on the scaling factor and location pair assigned to the respective transmit antenna.

In one aspect, the assigning is performed after removing pulses of the combined impulse response having peaks below the predetermined threshold. Thus, the removed pulses are not used for estimating of the wireless channels of the transmit antennas.

Figure 3:
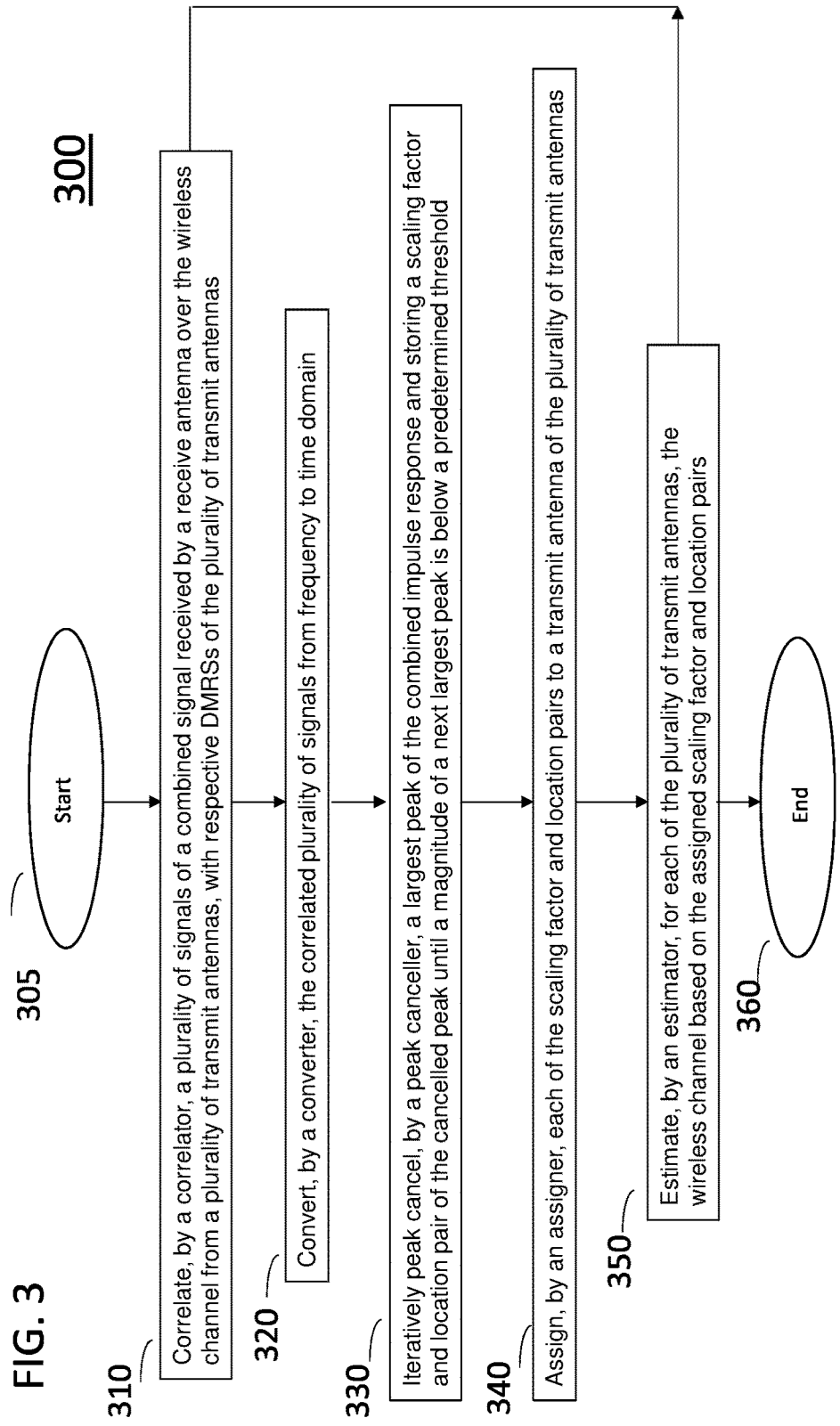
FIG. 3 illustrates a flowchart of a method for performing channel estimation using peak cancellation in accordance with the present disclosure.

FIG. 3 illustrates a flowchart of an example method 300 for performing channel estimation using peak cancellation in accordance with the present disclosure. A MIMO system implementing the Channel Estimation Method 300 is provided in "Example A" below.

In one aspect of the present disclosure, the method 300 may be implemented in a wireless device that comprises an array of receive antennas configured to receive a plurality of signals and an apparatus, e.g., apparatus 200, for estimating the wireless channel. For example, the method 300 may be implemented in an apparatus 200 wherein the correlating is performed by correlator 210, the converting is performed by convertor 220, the peak canceling in performed by peak canceler 230, the assigning is performed by assigner 240, and the estimator is performed by estimator 250. In another example, the method 300 may be implemented in a device 400, described below.

The method 300 starts in a step 305 and proceeds to step 310.

In step 310, the method correlates, by a correlator 210, a plurality of signals of a combined signal received by a receive antenna over the wireless channel 130 from a plurality of transmit antennas, with respective demodulation reference symbols (DMRSs) of the respective plurality of transmit antennas.

In step 320, the method converts, by a converter 220, the correlated plurality of signals from frequency domain to time domain, the converted plurality of signals comprising a combined impulse response of the combined signal.

In step 330, the method iteratively peak cancels, by a peak canceller 230, a largest peak of the combined impulse response and storing a scaling factor and location pair of the cancelled peak until a magnitude of a next largest peak is below a predetermined threshold.

In step 340, the method assigns, by an assigner 240, each of the scaling factor and location pairs to a transmit antenna of the plurality of transmit antennas.

In step 350, the method estimates, by an estimator 250, for each of the plurality of transmit antennas, the wireless channel 130 based on the assigned scaling factor and location pairs. Steps 310-350 are performed for each receive antenna of the plurality of receive antennas. Steps 310-350 are completed for all receive antennas of the array of antennas, thereby resulting with estimates of wireless channels for each transmit antenna transmitting a signal of the plurality of signals to the receive antennas. The method may then proceed either to step 360 to end the estimating of channels or to step 305 to receive other receive antennas for which the channel estimating is to be provided in accordance with the present disclosure.

Figure 4:
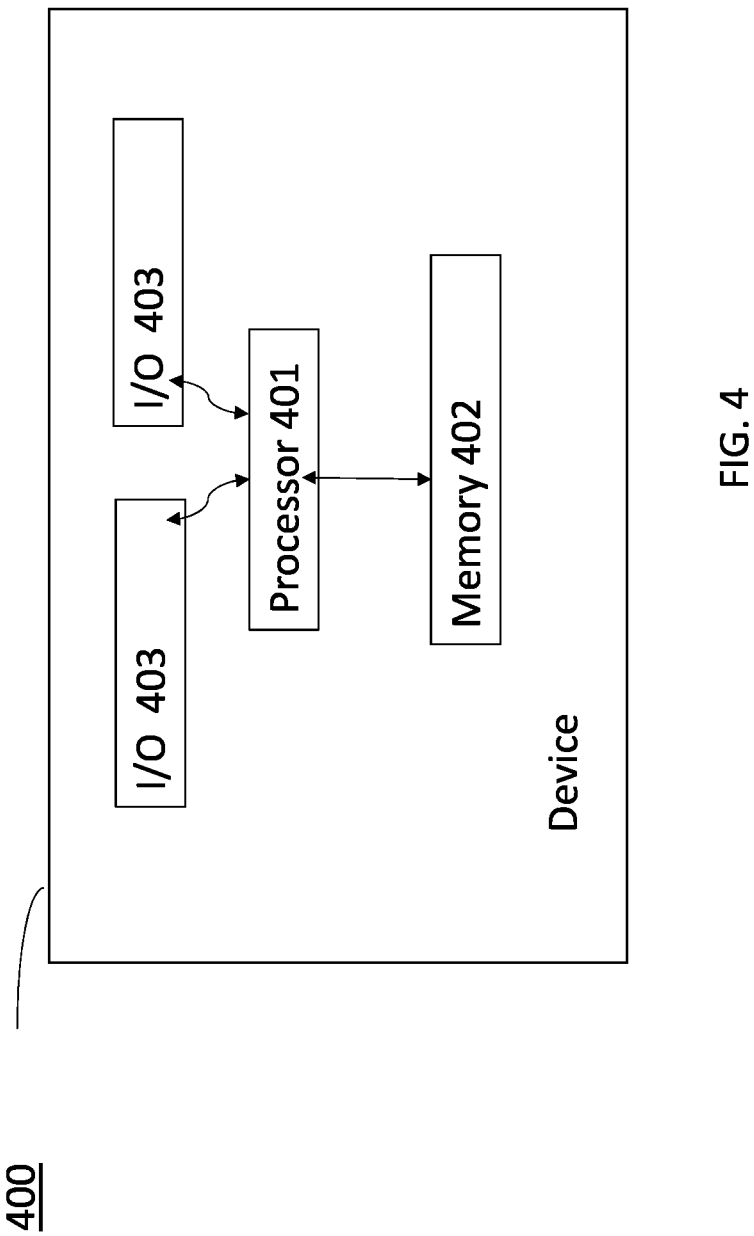
FIG. 4 illustrates a device for performing the functions described in the present disclosure.

FIG. 4 illustrates a device 400 for performing the functions described in the present disclosure. The device 400 comprises a processor 401 and a memory 402 configured to store a program instructions to be executed by the processor 401, where executing the program instructions causes the processor 401 to perform operations for estimating a wireless channel, the operations comprising, the correlating, converting, peak canceling, assigning and estimating. The device 400 may further comprise any number and type of input/output devices 403.

It is noted that although FIG. 4 illustrates a single device, the method 200 may be implemented via any number of devices performing the operations of method 300 in a distributed manner, serial manner, or a combination thereof. In addition, the devices may be virtualized devices instantiated on servers (e.g., servers of a cloud network). As such, the representation of the hardware components of the device may be a virtualized or a physical representation, without departing from the teaching of the present disclosure.

Accordingly, the method 300 may be implemented in hardware, software, or a combination thereof. It is noted that the processor 401 executing the program instructions includes the processor 401 performing the operations of the method 300 directly or indirectly. For example, the processor 401 may perform the operations in conjunction with other devices or may direct another device to perform the operations.

It is noted that the channel estimation of the present disclosure may be implemented in conjunction with other methods for improving the channel estimation. For example, spatial channel estimation methods and correlations between transmit antennas may be exploited to fine-tune the channel estimation methods of the present disclosure and/or to reduce time required for executing the iterative cancelations of largest peaks.

It should be understood that the aspects of the present disclosure are described above by way of examples. However, the various aspects are exemplary and not limitations. Thus, the scope of the present disclosure should not be construed as being limited by any of the above aspects or examples. The breadth and the scope of the present disclosure should be defined in accordance with the scope and breadth of the following claims and/or equivalents.

Example A: A MIMO System Implementing the Channel Estimation Method of the Present Disclosure As described above, the DMRS of the transmit antenna may consist a Zadoff-Chu base sequence that is extended and then multiplied by a linear phase complex exponential in the frequency domain. The Zadoff-Chu base sequence that is extended may be represented by $x_k^{ZC}$.

For example, suppose each transmit antenna is an antenna of a UE and no two transmit antennas belong to the same UE. Suppose also the receive antenna is an antenna of a base station. Then, for a given transmit antenna, e.g., a transmit antenna of a given UE, e.g., for UE 1, the DMRS may be expressed as $x_k^{(l)}$ as follows:

$$x_k^{(l)} = x_k^{ZC} e^{j\frac{2\pi}{L}lk}, \quad (1)$$

$$\text{where, } k = -\frac{N_{sc}}{2}, \ldots, \frac{N_{sc}}{2} - 1 \text{ and } l = 0, \ldots, L-1.$$

Equivalently, in matrix form, the DMRS for UE 1 may be expressed as:

$$X^{(l)} = X^{ZC} D^{(l)} \quad (2)$$

where, $X^{ZC}$ is a diagonal matrix, the entries on the diagonal of $X^{ZC}$ comprising the Zadoff-Chu sequence that is extended, and where, $D^{(l)}$ is a diagonal matrix, the entries on the diagonal of $D^{(l)}$ comprising the $l^{th}$ linear phase complex exponential.

After a wireless signal is transmitted by a UE, the signal traverses the wireless channel to reach a receiver wireless device, e.g., a base station. When the wireless signal reaches the receiver wireless device, the cyclic prefix is removed and the signal is converted to the frequency domain. For example, a cyclic prefix of size P may be removed from the received signal. Then, an N-point Discrete Fourier Transform (DFT) may be performed to convert the signal back to the frequency domain. Entries of the N-point DFT matrix $F_N$ may be defined as:

$$\{F_N\}_{k,n} = \frac{1}{\sqrt{N}} e^{-j\frac{2\pi}{N}kn}. \tag{3}$$

where, $$k = -\frac{N_{sc}}{2}, \ldots, \frac{N_{sc}}{2} - 1 \text{ and } n = 0, \ldots, N_{sc} - 1.$$

Note that a "DFT Shift" is included in the definition for convenience. Then, method 300 is performed for each receive antenna, individually, as described below.

Step 310

Then, step 310 of method 300 is performed for correlating a plurality of signals of a combined signal received by a receive antenna over the wireless channel from a plurality of transmit antennas, with respective demodulation reference symbols (DMRSs) of the respective plurality of transmit antennas.

For example, in the frequency domain, for each receive antenna i of the $N_{rx}$ receive antennas, the occupied sub-carriers may be selected and placed into a vector. The selection of the occupied sub-carriers is performed by correlating, in the frequency domain, the received signal with the DMRSs of the UEs. Since the selection and populating of the vector are performed per receive antenna, the vector contains an output of a Multiple-Input-Single-Output (MISO) channel. For instance, when a signal is received, first the cyclic prefix is removed from the received signal, then an N-point Discrete Fourier Transform (DFT) is performed. Then, for a given receive antenna i, the occupied sub-carriers are selected and put into a vector $y^{(i)}$. The vector $y^{(i)}$ is the output of the MISO channel and has components from any number of the L UEs.

Then, the vector $y^{(i)}$ may be written as:

$$y^{(i)} = \sum_{l=0}^{L-1} X^{(l)} h^{(i,l)} + w^{(i)}. \tag{4}$$

where, $h^{(i,l)}$ is an $N_{sc} \times 1$ vector containing the frequency domain channel coefficients $h_k^{(i,l)}$ from UE l to receive antenna i, and where, $w^{(i)}$ is a $N_{sc} \times 1$ vector containing Additive White Gaussian (AWG) noise for receive antenna i.

It is noted that the IDFT and DFT are matching algorithms. Suppose, the size of the IDFT is sufficiently large. For e.g., consider an N-point ($N_p$) IDFT. Then, the time-domain channel impulse response can be represented as:

$$g_n^{(i,l)} = \sum_{m=0}^{N_p-1} \alpha_m^{(i,l)} \delta_{n-d_m^{(i,l)}}. \tag{5}$$

Suppose $N_p = N_{ce}$, with $N_{ce}$ being large. Then, by performing an $N_{ce}$-point DFT on eqn. 5, in frequency domain:

$$h_k^{(i,l)} = \frac{1}{\sqrt{N_{ce}}} \sum_{n=0}^{N_{ce}-1} g_n^{(i,l)} e^{-j\frac{2\pi}{N_{ce}}kn} \tag{6}$$

$$= \frac{1}{\sqrt{N_{ce}}} \sum_{n=0}^{N_{ce}-1} \sum_{m=0}^{N_p-1} \alpha_m^{(i,l)} \delta_{n-d_m^{(i,l)}} e^{-j\frac{2\pi}{N_{ce}}kn}$$

$$= \frac{1}{\sqrt{N_{ce}}} \sum_{m=0}^{N_p-1} \alpha_m^{(i,l)} e^{-j\frac{2\pi}{N_{ce}}kd_m^{(i,l)}}$$

where, $k = -\frac{N_{ce}}{2}, \ldots, \frac{N_{ce}}{2} - 1.$

Returning to equation (4), for each receive antenna i, the frequency domain channel coefficients $h_k^{(i,l)}$ from UE l to receive antenna i may be rewritten using equation (6).

Suppose, in the frequency domain, each $h_k^{(i,l)}$ is band-limited to $$k = -\frac{N_{sc}}{2}, \ldots, \frac{N_{sc}}{2} - 1.$$

Then, an $N_{ce}$-point IDFT may be performed on the $h_k^{(i,l)}$. That is, the $N_{ce}$ point IDFT of the band limited frequency domain channel coefficients ($h_k^{(i,l)}$) may be determined.

Suppose, $\hat{g}_n^{(i,l)}$ represents the $N_{ce}$ point IDFT of the band limited frequency domain channel coefficients $h_k^{(i,l)}$. Then, $\hat{g}_n^{(i,l)}$ may be written as:

$$\hat{g}_n^{(i,l)} = \frac{1}{\sqrt{N_{ce}}} \sum_{k=-\frac{N_{sc}}{2}}^{\frac{N_{sc}}{2}-1} h_k^{(i,l)} e^{j\frac{2\pi}{N_{ce}}kn} \tag{7}$$

$$= \frac{1}{N_{ce}} \sum_{k=-\frac{N_{sc}}{2}}^{\frac{N_{sc}}{2}-1} \sum_{m=0}^{N_p-1} \alpha_m^{(i,l)} e^{-j\frac{2\pi}{N_{ce}}kd_m^{(i,l)}} e^{j\frac{2\pi}{N_{ce}}kn}$$

$$= \frac{1}{N_{ce}} \sum_{m=0}^{N_p-1} \alpha_m^{(i,l)} \sum_{k=0}^{N_{sc}-1} e^{j\frac{2\pi}{N_{ce}}(k-\frac{N_{sc}}{2})(n-d_m^{(i,l)})}$$

$$= \frac{1}{N_{ce}} \sum_{m=0}^{N_p-1} \alpha_m^{(i,l)} e^{-j\frac{\pi N_{sc}}{N_{ce}}(n-d_m^{(i,l)})} \sum_{k=0}^{N_{sc}-1} e^{j\frac{2\pi}{N_{ce}}k(n-d_m^{(i,l)})}$$

Then, using, $$\sum_{k=0}^{N-1} e^{jkx} = e^{j\frac{x}{2}(N-1)} \frac{\sin\left(\frac{Nx}{2}\right)}{\sin\left(\frac{x}{2}\right)} \text{ or } \sum_{k=0}^{N-1} a^k = \frac{1-a^N}{1-a},$$

equation (7) may be rewritten as follows:

$$\hat{g}_n^{(i,l)} = \tag{8}$$

$$\frac{1}{N_{ce}} \sum_{m=0}^{N_p-1} \alpha_m^{(i,l)} e^{-j\frac{\pi N_{sc}}{N_{ce}}(n-d_m^{(i,l)})} e^{j\frac{\pi}{N_{ce}}(n-d_m^{(i,l)})(N_{sc}-1)} \frac{\sin\left(\frac{\pi N_{sc}}{N_{ce}}(n-d_m^{(i,l)})\right)}{\sin\left(\frac{\pi}{N_{ce}}(n-d_m^{(i,l)})\right)} =$$

$$\frac{1}{N_{ce}} \sum_{m=0}^{N_p-1} \alpha_m^{(i,l)} e^{-j\frac{\pi}{N_{ce}}(n-d_m^{(i,l)})} \frac{\sin\left(\frac{\pi N_{sc}}{N_{ce}}(n-d_m^{(i,l)})\right)}{\sin\left(\frac{\pi}{N_{ce}}(n-d_m^{(i,l)})\right)}$$

As shown above, $\hat{g}_n^{(i,l)}$ is a linear combination of delayed replicas of a pulse shape. Thus, for convenience, we define a band-limited pulse shape, with unity peak as:

$$p_n = \frac{1}{N_{sc}} e^{-j\frac{\pi}{N_{ce}}n} \frac{\sin\left(\frac{\pi N_{sc}}{N_{ce}}n\right)}{\sin\left(\frac{\pi}{N_{ce}}n\right)} \tag{9}$$

Similarly, we define $$v_m^{(i,l)} = \frac{1}{\sqrt{N_{ce}}} \alpha_m^{(i,l)}, \text{ and } \tilde{g}_n^{(i,l)} = \frac{\sqrt{N_{ce}}}{N_{sc}} \hat{g}_n^{(i,l)}. \tag{10}$$

As such, if $\tilde{g}_n^{(i,l)}$ is the scaled $N_{ce}$-point IDFT of $h_k^{(i,l)}$, $\tilde{g}_n^{(i,l)}$ can be expressed as the linear combination of delayed replicas of pulse shape $p_n$. Similarly, $h_k^{(i,l)}$ can be expressed as the same linear combination of exponential functions with linear phase shifts.

The main equations to be used in channel estimation are summarized in equation (11), as shown below. Note that equation (11) is defined for each UE. That is, $\tilde{g}_n^{(i,l)}$ is the scaled impulse response of the transmit antenna i. However, from the perspective of the receive antenna, the received signal comprises the scaled impulse responses of all L transmit antennas, forming a combined impulse response.

$$\tilde{g}_n^{(i,l)} = \frac{\sqrt{N_{ce}}}{N_{sc}} \left( \frac{1}{\sqrt{N_{ce}}} \sum_{k=-\frac{N_{sc}}{2}}^{\frac{N_{sc}}{2}-1} h_k^{(i,l)} e^{j\frac{2\pi}{N_{ce}}kn} \right), \quad (11)$$

$$\tilde{g}_n^{(i,l)} = \sum_{m=0}^{N_p-1} v_m^{(i,l)} p_{n-d_m^{(i,l)}},$$

$$h_k^{(i,l)} = \sum_{m=0}^{N_p-1} v_m^{(i,l)} e^{-j\frac{2\pi}{N_{ce}}kd_m^{(i,l)}}, \text{ and}$$

$$p_n = \frac{1}{N_{sc}} e^{-j\frac{\pi}{N_{ce}}n} \frac{\sin\left(\frac{\pi N_{sc}}{N_{ce}}n\right)}{\sin\left(\frac{\pi}{N_{ce}}n\right)}.$$

As described above, the method of the present disclosure performs the channel estimation for each receive antenna, independently, and separates the UEs from which transmitted signals are received. Hence, the channel estimation procedure is repeated for every receive antenna. The DMRS symbol for each UE is known and consists the extended Zadoff-Chu base sequence that is extended (i.e., $x_k^{ZC}$) and then multiplied by a linear phase complex exponential in the frequency domain. Moreover, the DFT of the receive antenna matches the IDFT of the transmit antenna (i.e., the antenna of the UE). Recall that $N_{sc}$ represents the number of occupied sub-carriers and $N_{ce}$ represents the size of the IDFT. As such, both the $N_{sc}$ and the $N_{ce}$ are known to the device performing the channel estimation.

Then, a zero extension operator that maps an $N_{Sc} \times 1$ vector s to an $N_{ce} \times 1$ vector may be defined as:

$$Ex\{s\} = \left(0_{\frac{N_{ce}-N_{sc}}{2} \times 1}, s^T, 0_{\frac{N_{ce}-N_{sc}}{2} \times 1}\right)^T. \quad (12)$$

Returning to the output of the MISO channel, recall that the vector $y^{(i)}$ is constructed by: removing the cyclic prefix from a received signal, performing an N-point DFT, selecting the occupied sub-carriers for the receive antenna and putting the selected sub-carriers into the vector $y^{(i)}$.

Then, the method may multiply $y^{(i)}$ by the complex conjugate of the base Zadoff-Chu sequence, and zero extend the product of $y^{(i)}$ and the complex conjugate of the base Zadoff-Chu sequence to form a vector $z^{(i)}$ in the frequency domain, as follows:

$$z^{(i)} = Ex\{(X^{ZC})^H y^{(i)}\} \quad (1)$$

$$= \sum_{l=0}^{L-1} Ex\{(X^{ZC})^H X^{(l)} h^{(i,l)}\} + Ex\{(X^{ZC})^H w^{(i)}\}$$

$$= \sum_{l=0}^{L-1} Ex\{D^{(l)} h^{(i,l)}\} + Ex\{\omega^{(i)}\}$$

Since Zadoff-Chu sequence is used, $\omega^{(i)}$ is still a vector of Independent and Identically Distributed (IID) Gaussian random variables with the same variance as $w^{(i)}$.

Step 320

Then, step 320 of method 300 is performed to convert the correlated plurality of signals from frequency domain to time domain and scaled. The converted plurality of signals comprise a combined impulse response of the combined signal.

For example, vector $z^{(i)}$ may be converted to the time domain by performing an $N_{ce}$-point IDFT on $z^{(i)}$. Then, the output of the $N_{ce}$-point IDFT may be scaled by $\sqrt{N_{ce}}/N_{sc}$ to obtain $r^{(i)}$.

Thus, in the time domain, $$r^{(i)} = \frac{\sqrt{N_{ce}}}{N_{sc}} F_{N_{ce}}^H z^{(i)} \quad (14)$$

$$= \frac{\sqrt{N_{ce}}}{N_{sc}} \sum_{l=0}^{L-1} F_{N_{ce}}^H Ex\{D^{(l)} h^{(i,l)}\} + \frac{\sqrt{N_{ce}}}{N_{sc}} F_{N_{ce}}^H Ex\{\omega^{(i)}\}$$

Now Consider:

$$\frac{\sqrt{N_{ce}}}{N_{sc}} \{F_{N_{ce}}^H Ex\{D^{(l)} h^{(i,l)}\}\}_n = \frac{\sqrt{N_{ce}}}{N_{sc}} \left( \frac{1}{\sqrt{N_{ce}}} \sum_{k=-\frac{N_{sc}}{2}}^{\frac{N_{sc}}{2}-1} h_k^{(i,l)} e^{j\frac{2\pi}{L}lk} e^{j\frac{2\pi}{N_{ce}}kn} \right) \quad (15)$$

$$= \frac{\sqrt{N_{ce}}}{N_{sc}} \left( \frac{1}{\sqrt{N_{ce}}} \sum_{k=-\frac{N_{sc}}{2}}^{\frac{N_{sc}}{2}-1} h_k^{(i,l)} e^{j\frac{2\pi}{N_{ce}}k\left(n+\frac{N_{ce}}{L}l\right)} \right)$$

$$= \tilde{g}_{n+\frac{N_{ce}}{L}l}^{(i,l)}.$$

Hence, $r_n^{(i)} = \sum_{l=0}^{L-1} \tilde{g}_{n+\frac{N_{ce}}{L}l}^{(i,l)} + \frac{\sqrt{N_{ce}}}{N_{sc}} F_{N_{ce}}^H Ex\{\omega^{(i)}\}.$ \quad (16)

As shown in equation (16), $r_n^{(i)}$ contain, in time domain, the scaled impulse responses of all L transmit antennas $\tilde{g}_n^{(i,l)}$ staggered in $$\frac{N_{ce}}{L}$$

sample intervals. Then, in one aspect of the present disclosure, the method may band limit the $r_n^{(i)}$. Recall that the digital Sinc function is the IDFT of a rectangular window whose bandwidth equals the bandwidth of the system. When the channel is band-limited, the impulse response will expand. This causes some of the energy of the impulse response to leak outside of this window and also to cause interference with the impulse responses of the other UEs. Suppose, each impulse response is assumed to be contained within a certain window. Then, the length of the infinite bandwidth impulse response of the channel should fit within the window $$\frac{N_{ce}}{L} l + \left(0, \ldots, P\frac{N_{ce}}{N} - 1\right),$$

where P is the cyclic prefix length when using an N-point IDFT. However, in practice, a set of windows $$\frac{N_{ce}}{L}l + (-N_{prec}, \ldots, N_{post})$$

may be defined, where $N_{prec}$ is the number of pre-cursor samples and $N_{post}$ is the number of post-cursor samples.

Then, the method proceeds to separating the signal received from the various users using peak cancellation.
Step 330

In step 330, the method iteratively peak cancels a largest peak of the combined impulse response and stores a scaling factor and location pair of the cancelled peak until a magnitude of a next largest peak is below a predetermined threshold. The peak cancelation is for separating the signals without windowing.

In one aspect, the peak cancelation is performed after removing the samples outside the impulse response windows. The removing of the samples comprises replacing all the samples outside the impulse response windows with zeros. The removing is performed prior to separating the users, i.e., prior to performing the peak cancellation.

It is important to note that the band limiting, described above, removes sub-carriers or information. Hence, finding the infinite bandwidth peaks of the original signal is not possible. Thus, for the purpose of the peak cancellation, rather than finding the locations of the original peaks, the method determines an approximation for the band limited impulse response and cancels the peaks, as described below.

Suppose, an approximation for $r_n^{(i)}$ is defined with a function of the form:

$$r_n^{(i)} \approx \sum_{m=0}^{N_pL-1} v_m^{(i)} p_{n-d_m^{(i)}}, \quad (17)$$

where the $p_{n-d_m^{(i)}}$ are digital Sinc functions (See also eqn. 11).

In one aspect of the present disclosure, the approximation may be found iteratively, with the iteration comprising (1)-(6):

(1) The method identifies a pulse of a largest peak for the combined impulse response, and determines a location and a magnitude of the pulse of the largest peak that is identified. For example, a maximum $|r_n^{(i)}|^2$ may be computed and the location of the maximum $|r_n^{(i)}|^2$ may be determined.

(2) The method determines whether the magnitude of the pulse of the largest peak is below a predetermined threshold. When the magnitude of the pulse of the largest peak is below the predetermined threshold, the iteration for peak cancellation is terminated and the method proceeds to (6). For example, all UEs may have already been identified or the remaining signal may be indistinguishable from the noise of the channel. Assuming a channel of normal noise levels, when there are L UEs, the iteration stops when the peaks associated with the L UEs are iteratively canceled. When the magnitude of the pulse of the largest peak is at or above the predetermined threshold, the iteration for peak cancellation is continued.

(3) The method defines and subtracts a band limited pulse (e.g., a digital Sinc function) from the combined impulse response, wherein the band limited pulse is defined at the location of the pulse of the largest peak and is appropriately scaled for canceling the pulse of the largest peak from the combined impulse response. For example, the band limited pulse may be defined at the location of the maximum $|r_n^{(i)}|^2$ and appropriately scaled by $r_n^{(i)}$. Hence, subtracting the band limited pulse that is appropriately scaled removes the pulse of the largest peak.

(4) The method stores the location of the pulse of the largest peak and a scaling coefficient. The scaling coefficient is the scaling used for the appropriately scaling of the band limited pulse for canceling the pulse of the largest peak.

(5) The method returns to (1).

(6) The method ends the peak cancellation.

An example of an algorithm for performing the peak cancellation is provided below. Suppose the locations (i.e., positions of pulses of largest peaks) are represented by $d_m$, and the respective scaling coefficients are represented by $v_m$, for m=0, ..., $N_pL$-1. The algorithm may begin by initializing. For example, the process may begin by defining: $b_n = r_n^{(i)}$, wherein the $r_n^{(i)}$ contains the scaled impulse response of all L transmit antennas. The algorithm is run for m=0, ..., $N_pL$-1, for an $N_p$-point IDFT.

Example 1: An Algorithm for Performing Peak Cancellation $$b_n = r_n^{(i)}$$

For $m = 0, \ldots, N_pL - 1$ $$d_m = \arg\max_n |b_n|^2$$

$$v_m = b_{d_m}$$

$$b_n = b_n - v_m \cdot p_{n-d_m}$$

End

The $d_m$ and $v_m$ are stored for further processing.

Once the peak cancellation is completed, the method identifies and removes the pulses of the combined impulse response having a magnitude below the predetermined threshold. The remaining impulse responses are for the M impulse responses of the UEs. In other words, we get M pulses located at the locations $d_m$, with m=0, ..., M-1. The pulse located at $d_m$ has a corresponding scaling coefficient of $v_m$. Then, the method proceeds to step 340.
Step 340

In step 340, the method assign each of the scaling factor and location pairs to a transmit antenna of the plurality of transmit antennas. Since each transmit antenna of the current example is for a given UE, the assigning of the pulse to the transmit antennas is equivalent to assigning of the pulse to a specific UE. For example, the pulses located at the M pairs of location and scaling coefficient (i.e., the pairs stored in step 330) may be assigned as follows.

First, let $d^{(l)} = [d_0^{(l)}, \ldots, d_{m_l-1}^{(l)}]$ for l=0, ..., L-1 be a vector of size $M_l$ containing the delays $d_m$ for which $$\left\lfloor \frac{(d_m + N_{prec})L}{N_{ce}} \right\rfloor = l.$$

In addition, let $v^{(l)} = [v_0^{(l)}, \ldots, v_{M_l-1}^{(l)}]$ for l=0, ..., L-1 be the corresponding vector of size $M_l$ containing the coefficient values $v_m$. Each pair of location and scaling coefficient may then be assigned to a UE.
Step 350

In step 350, the method estimates, for each of the plurality of transmit antennas, the wireless channel based on the assigned scaling factor and location pairs.

Thus, the channel frequency response for each UE transmitting to the receive antennas is constructed. In one aspect of the present disclosure, the channel frequency response for each UE may be defined as the weighted sum of linear phase rotations in the frequency domain using the respective stored values for $v_m^{(l)}$ and $d_m^{(l)}$ as follows.

$$\text{For } l = 0, \ldots, L-1,$$
$$h_k^{(l)} = 0, \text{ for } k = -\frac{N_{sc}}{2}, \ldots, \frac{N_{sc}}{2} - 1.$$
$$\text{For } m = 0, \ldots, M_l - 1,$$
$$h_k^{(l)} = h_k^{(l)} + v_m^{(l)} e^{-j\frac{2\pi}{N_{ce}} k d_m^{(l)}}, \text{ for } k = -\frac{N_{sc}}{2}, \ldots, \frac{N_{sc}}{2} - 1.$$
$$\text{End}$$
$$h_k^{(i,l)} = h_k^{(l)}, \text{ for } k = -\frac{N_{sc}}{2}, \ldots, \frac{N_{sc}}{2} - 1.$$

In one aspect of the present disclosure, the values of $v^{(l)}$ are further refined by performing least squares estimation. For example, for $l=0, \ldots, L-1$, a matrix P may be defined as:

$$P = \left[ p_{d_0^{(l)}}^H, \ldots, p_{d_{M_l-1}^{(l)}}^H \right], \quad (18)$$

where $p_d = [p_d(0), \ldots, p_d(N_{ce}-1)]$ is an $1 \times N_{ce}$ vector with entries:

$$p_d(n) = \frac{1}{N_{sc}} e^{-j\frac{\pi}{N_{ce}}(n-d)} \frac{\sin\left(\frac{\pi N_{sc}}{N_{ce}}(n-d)\right)}{\sin\left(\frac{\pi}{N_{ce}}(n-d)\right)}. \quad (19)$$

Then, the coefficients $v^{(l)}$ may be replaced by coefficients that minimize $\|Pv^{(l)} - r^{(l)}\|^2$, i.e., $v^{(l)} = (P^H P)^{-1} P^H r^{(l)}$.

What is claimed is:

1. An apparatus for estimating a wireless channel, the apparatus comprising:
    a correlator configured to correlate a plurality of signals of a combined signal received by a receive antenna over the wireless channel from a plurality of transmit antennas, with respective demodulation reference symbols (DMRSs) of the respective plurality of transmit antennas;
    a converter configured to convert the correlated plurality of signals from frequency domain to time domain, the converted plurality of signals comprising a combined impulse response of the combined signal;
    a peak canceller configured to iteratively peak cancel a largest peak of the combined impulse response and store a scaling factor and location pair of the cancelled peak until a magnitude of a next largest peak is below a predetermined threshold;
    an assigner configured to assign each of the scaling factor and location pairs to a transmit antenna of the plurality of transmit antennas; and
    an estimator configured to estimate, for each of the plurality of transmit antennas, the wireless channel based on the assigned scaling factor and location pairs.

2. The apparatus of claim 1, wherein the DMRSs of the respective transmit antennas are known to the receiver.

3. The apparatus of claim 1, wherein the peak canceller is configured to:
    determine the location of the largest peak; and
    subtract, from the combined impulse response, a band limited pulse defined at the location of the largest peak, the band limited pulse being scaled according to the scaling factor of the largest peak.

4. The apparatus of claim 3, wherein the peak canceller is configured to determine the location of the largest peak by:
    band limiting each impulse response of the combined impulse response;
    computing squares of magnitudes of each of the impulse responses; and
    identifying the location of the largest peak as the location of the impulse response associated with a maximum of the squares of magnitudes.

5. The apparatus of claim 3, wherein the band limited pulse comprises a digital Sinc function.

6. The apparatus of claim 1, wherein the correlator is configured to correlate by:
    selecting occupied one or more sub-carriers of each of the plurality of signals in a frequency domain;
    match filtering the selected sub-carriers; and
    zero-extending the match filtered sub-carriers in accordance with symbol converters of the respective transmit antennas.

7. The apparatus of claim 6, wherein the symbol converters of the respective plurality of transmit antennas are known to the receiver.

8. The apparatus of claim 6, wherein the symbol converters are Orthogonal Frequency Division Multiplex (OFDM) symbol converters.

9. The apparatus of claim 6, wherein the match filtering is performed using filters derived to match the DMRSs of the respective transmit antennas.

10. The apparatus of claim 1, wherein the DMRSs of the respective plurality of transmit antennas comprise a Zadoff-Chu base sequence that is zero-extended and multiplied by a linear phase complex exponential in the frequency domain.

11. The apparatus of claim 1, wherein the converter is configured to:
    determine scaled inverse discrete Fourier transforms of the correlated plurality of signals.

12. The apparatus of claim 11, wherein the scaled inverse discrete Fourier transforming of a correlated signal of the plurality of correlated signals comprises converting the correlated signal to time domain and multiplying a result of the converting by a scaler quantity.

13. The apparatus of claim 1, wherein the converter is configured to:
    determine Inverse Fourier Transforms (IFT) or inverse Fast Fourier Transforms (IFFT) of the correlated plurality of signals.

14. The apparatus of claim 1, wherein the assigner is configured to perform the assigning after removing pulses of the combined impulse response having peaks below the predetermined threshold, wherein the removed pulses are not used in the estimating of the wireless channel.

15. The apparatus of claim 1, wherein the estimator is configured to perform the estimating by determining a frequency response of the wireless channel as a weighted sum of linear phase rotations in the frequency domain based on the scaling factor and location pair assigned to the respective transmit antenna.

16. The apparatus of claim 1, wherein any number of the plurality of transmit antennas are antennas of a single device, the number being greater than or equal to one and less than or equal to the number of the plurality of transmit antennas.

17. A wireless device comprising:
    an array of receive antennas configured to receive the plurality of signals; and the apparatus for estimating the wireless channel of claim 1,
for each receive antenna of the plurality of receive antennas, wherein the apparatus is configured to estimate the wireless channel for each transmit antenna transmitting a signal of the plurality of signals to the receive antenna.

18. The wireless device of claim 17, wherein the wireless device is a user equipment.

19. The wireless device of claim 17, wherein the wireless device is a base station.

20. A method for estimating a wireless channel, the method comprising:
correlating, by a correlator, a plurality of signals of a combined signal received by a receive antenna over the wireless channel from a plurality of transmit antennas, with respective demodulation reference symbols (DMRSs) of the respective plurality of transmit antennas;
converting, by a converter, the correlated plurality of signals from frequency domain to time domain, the converted plurality of signals comprising a combined impulse response of the combined signal;
iteratively peak canceling, by a peak canceller, a largest peak of the combined impulse response and storing a scaling factor and location pair of the cancelled peak until a magnitude of a next largest peak is below a predetermined threshold;
assigning, by an assigner, each of the scaling factor and location pairs to a transmit antenna of the plurality of transmit antennas; and
estimating, by an estimator, for each of the plurality of transmit antennas, the wireless channel based on the assigned scaling factor and location pairs.

21. The method of claim 20, wherein the peak cancelling comprises:
determining the location of the largest peak; and
subtracting, from the combined impulse response, a band limited pulse defined at the location of the largest peak, the band limited pulse being scaled according to the scaling factor of the largest peak.

22. The method of claim 20, wherein the DMRSs of the respective transmit antennas are known to the receiver.

23. A device comprising:
a processor; and
a memory configured to store a program instructions to be executed by the processor, where executing the program instructions causes the processor to perform operations for estimating a wireless channel, the operations comprising:
correlating a plurality of signals of a combined signal received by a receive antenna over the wireless channel from a plurality of transmit antennas, with respective demodulation reference symbols (DMRSs) of the respective plurality of transmit antennas;
converting the correlated plurality of signals from frequency domain to time domain, the converted plurality of signals comprising a combined impulse response of the combined signal;
iteratively peak canceling a largest peak of the combined impulse response and storing a scaling factor and location pair of the cancelled peak until a magnitude of a next largest peak is below a predetermined threshold;
assigning each of the scaling factor and location pairs to a transmit antenna of the plurality of transmit antennas; and
estimating, for each of the plurality of transmit antennas, the wireless channel based on the assigned scaling factor and location pairs.

24. The device of claim 23, wherein the peak cancelling comprises:
determining the location of the largest peak; and
subtracting, from the combined impulse response, a band limited pulse defined at the location of the largest peak, the band limited pulse being scaled according to the scaling factor of the largest peak.

25. The device of claim 23, wherein the DMRSs of the respective transmit antennas are known to the receiver.

* * * * *